(12) United States Patent
Jellicoe

(10) Patent No.: US 7,107,018 B2
(45) Date of Patent: Sep. 12, 2006

(54) COMMUNICATION DEVICE HAVING MULTIPLE KEYPADS

(75) Inventor: Roger J. Jellicoe, Woodstock, IL (US)

(73) Assignee: Motorola, Inc., Schaumburg, IL (US)

( * ) Notice: Subject to any disclaimer, the term of this patent is extended or adjusted under 35 U.S.C. 154(b) by 71 days.

(21) Appl. No.: 10/661,760

(22) Filed: Sep. 12, 2003

(65) Prior Publication Data

US 2005/0059438 A1 Mar. 17, 2005

(51) Int. Cl.
H04B 1/38 (2006.01)

(52) U.S. Cl. .............. 455/90.3; 455/575.4; 455/575.1

(58) Field of Classification Search ............ 455/575.4, 455/575.1, 550.1, 556.2, 566; 379/433.07, 379/364, 368, 369, 433.04; 700/84; 463/37; 345/168; 361/679, 680–681
See application file for complete search history.

(56) References Cited

U.S. PATENT DOCUMENTS 6,665,173 B1 * 12/2003 Brandenberg et al. ...... 361/680
6,707,664 B1 * 3/2004 Murphy ...................... 361/680
6,810,119 B1 * 10/2004 Lahr .......................... 379/368
6,825,832 B1 * 11/2004 Chung et al. ............... 345/168
6,834,199 B1 * 12/2004 Hyun et al. .............. 455/575.1
6,850,226 B1 * 2/2005 Finke-Anlauff ............. 345/169
2004/0207604 A1 * 10/2004 Chuang ...................... 345/168
2005/0017953 A1 * 1/2005 Pekka ......................... 345/169

* cited by examiner

Primary Examiner—Matthew D. Anderson
Assistant Examiner—Lewis West
(74) Attorney, Agent, or Firm—Design IP

(57) ABSTRACT

A communication device having a front housing and first and second independent keypad housings having respective keypads functionally connected to the front housing. The front housing has a speaker, a microphone, and a display panel. Each keypad has a key configuration that is different than the other. The front housing, first keypad housing, and second keypad housing are constructed to overlap and stack in a nested configuration in which each of the keypads is concealed by the front housing. The front housing is movable relative to each of the keypad housings from the nested configuration to an extended position in which one of the keypads is exposed and physically accessible by a user.

25 Claims, 4 Drawing Sheets

COMMUNICATION DEVICE HAVING MULTIPLE KEYPADS

BACKGROUND OF THE INVENTION

The present invention relates to a communication device, such as a wireless telephone, having a plurality of independent, differently-configured keypads functionally connected to a single display panel. As used herein, the term "functionally connected" means that input from one of the elements in question affects the other element. In the context of a keypad and display panel, input from the keypad (e.g., pressing a key or rocking a joy button) affects what is displayed on the display panel (e.g., displaying a letter or number, navigating a menu, or selecting a function). Of course, the "connection" between such elements can be somewhat indirect. In the case of a keypad and display panel, a display output circuit may change what appears on the display panel in response to input from the keypad, for example.

Over the past decade, the number of wireless telephone users has grown exponentially. As the number of users has grown, the demand for increased cell phone functionality has also grown. For example, wireless telephones can now be used to send and receive text messages and e-mail messages. Further, many wireless telephones have video games, calculators and other electronic programs incorporated therein.

On prior art wireless telephones, each of the programs and functions is controlled using a single standard alpha-numeric telephone keypad, or a single alpha-numeric telephone keypad that has reconfigurable keys. However, because of the aforementioned variety of programs and functions, a single standard keypad or a reconfigurable alpha-numeric keypad is not user friendly and limits functionality.

BRIEF DESCRIPTION OF THE DRAWINGS

The present invention will hereinafter be described in conjunction with the appended drawing figures wherein like numerals denote like elements.

DETAILED DESCRIPTION

Figure 1:
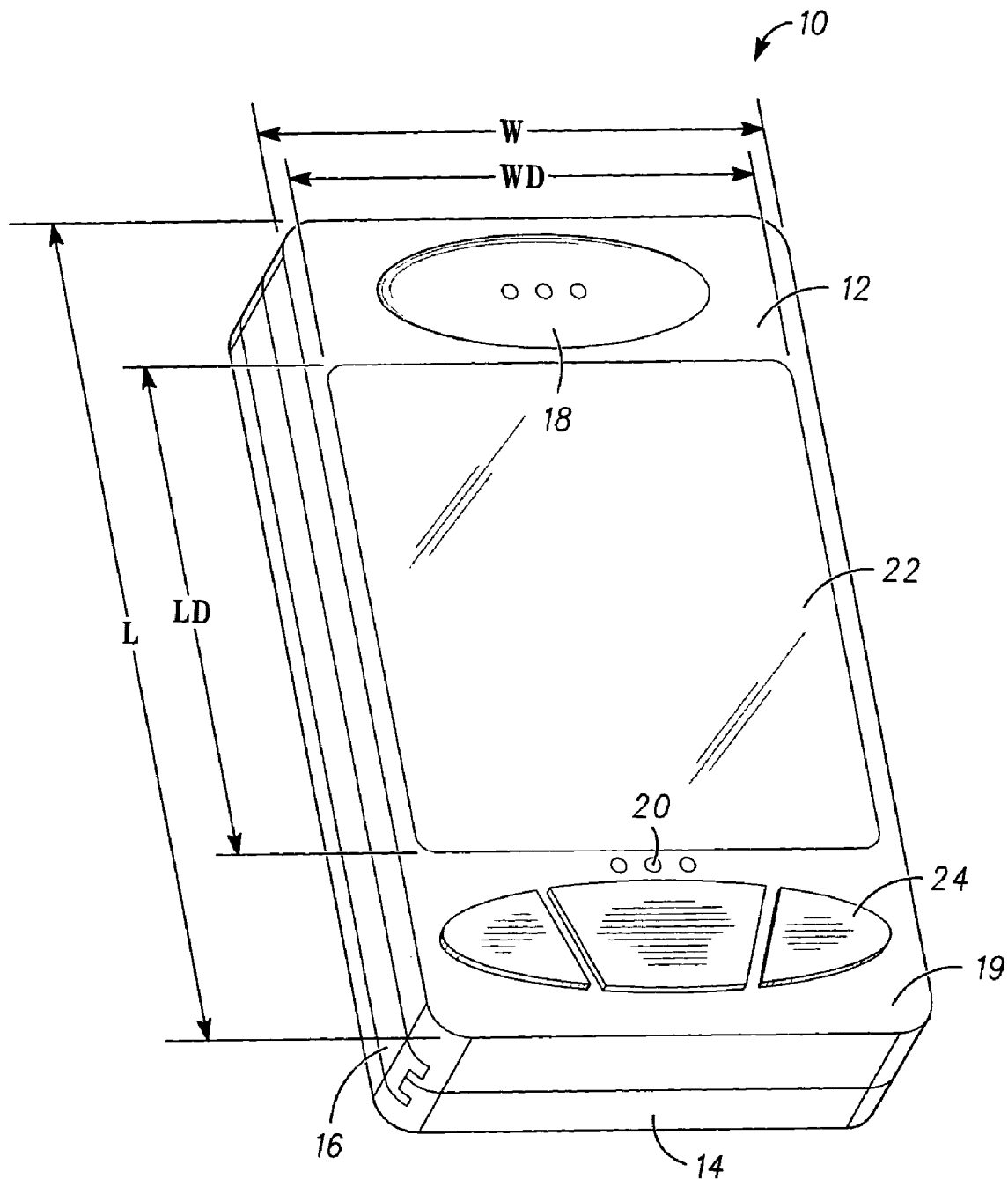
FIG. 1 is a perspective view of a wireless communication device in accordance with an embodiment of the invention wherein the front housing and keypads are arranged in a nested configuration.

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing the exemplary embodiments of the invention. It being understood that various changes may be made in the function and arrangement of elements without departing from the spirit and scope of the invention, as set forth in the appended claims. In addition, reference numerals that are introduced in the specification in association with a particular drawing figure may be repeated in other figures without additional description in the specification in order to provide context for other features.

Figure 2:
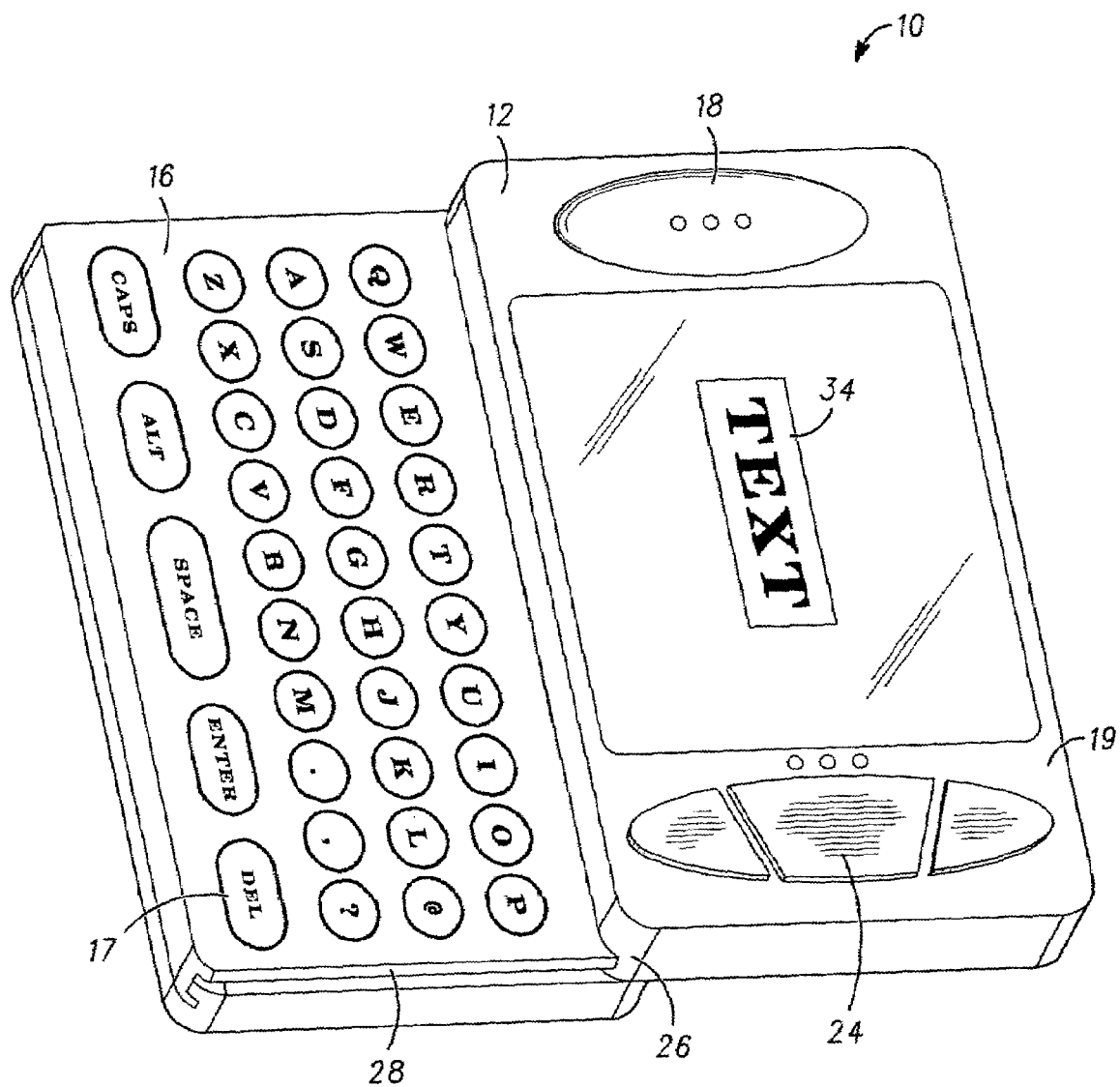
FIG. 2 is a perspective view of the wireless communication device of FIG. 1 wherein the front housing has been slid in the widthwise direction to expose a QWERTY keypad.
Figure 3:
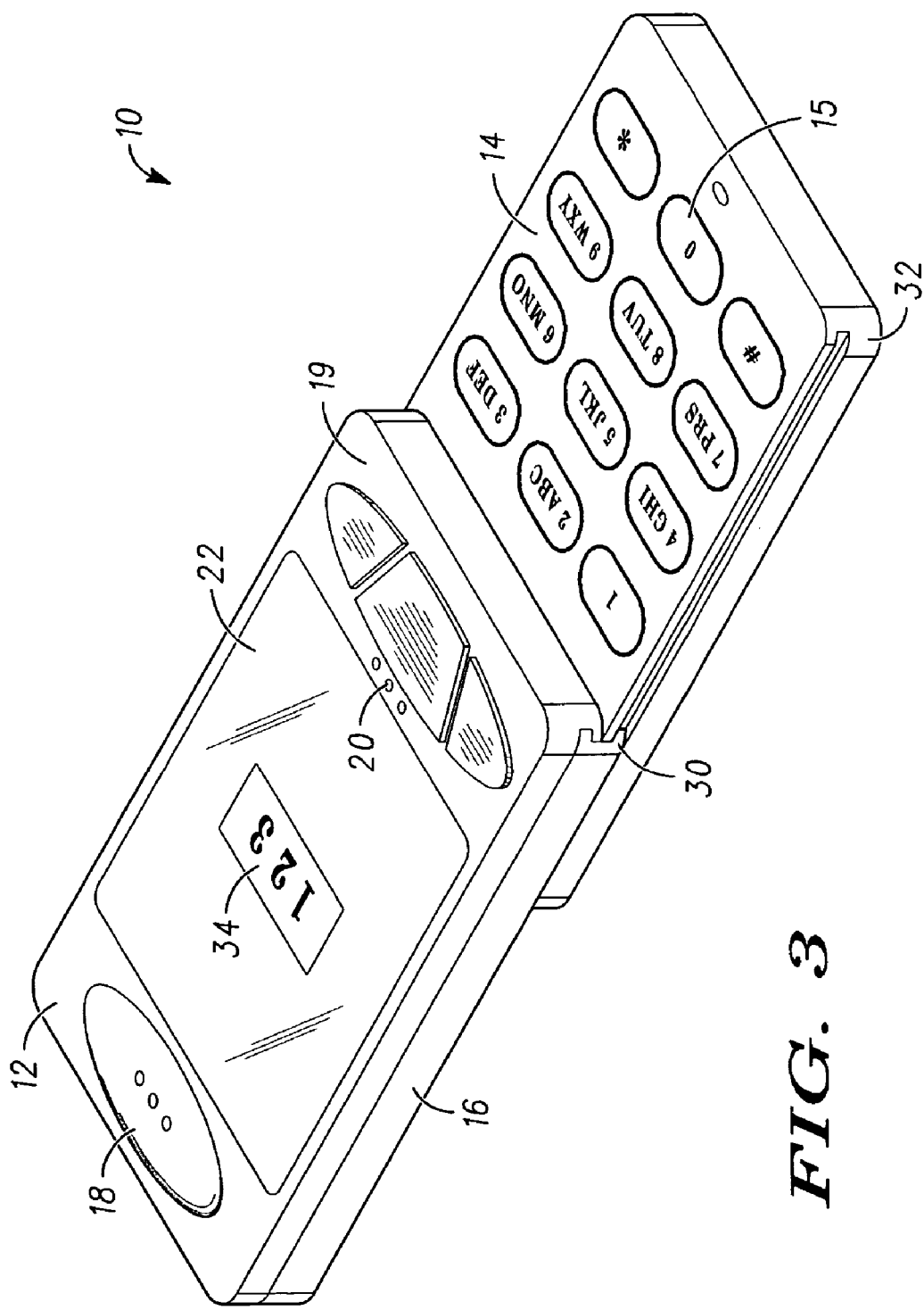
FIG. 3 is a perspective view of the wireless communication device of FIG. 1 wherein the front housing has been slid in the lengthwise direction to expose a telephone keypad.

A wireless communication device is shown in FIGS. 1–3 and is designated generally by reference numeral 10. The wireless communication device 10 generally comprises a front housing 12, a first keypad housing 14 and second keypad housing 16. Each of the keypad housings 14, 16 houses a respective keypad 15, 17. Although the wireless communication device is illustrated and described herein as having only two independent keypad housings, it will be appreciated by one of ordinary skill in the art that the device 10 could be provided with more than two independent keypad housings without departing from the scope of the present invention.

The front housing 12 and keypad housings 14, 16 can be arranged in various configurations by sliding the front housing 12 and keypad housings 14, 16 transversely in parallel planes relative to one another. In the "nested configuration" illustrated in FIG. 1, the front housing 12, first keypad housing 14 and second keypad housing 16 are arranged in a stacked, overlapping configuration with the front housing 12 on top, the first keypad housing 14 on the bottom, and the second keypad housing 16 in the middle. In the configurations illustrated in FIGS. 2 and 3, the front housing 12 has been moved to an "extended position" relative to the keypad housings 14, 16 so that one of the keypads 15, 17 is exposed for functional operation by a user.

In the extended positions shown in FIGS. 2–3, the front housing 12 is arranged in a parallel plane that is substantially non-overlapping with at least one keypad (15 or 17) so that the keys of the keypad (15 or 17) are exposed and physically accessible by a user. It should be noted that the term "keys", as used in the specification and claims may include keys, buttons, and the like. In the extended positions shown in FIGS. 2–3, the front housing 12 overlaps the exposed keypad along a short length that connects the front housing 12 to the keypad housing (14 or 16).

Referring to FIG. 1, the communication device 10 has a width (W) and a length (L) that is greater than the width. Each of the keypad housings 14, 16 and the front housing 12 is generally-planar and rectangular. Each also has approximately the same length and width, but different thicknesses. The communication device 10 may be cellular telephone, a cordless telephone, a personal digital assistant, a wireless text device, or the like.

The front housing 12 includes a faceplate 19, an earpiece loudspeaker 18, a microphone 20, display panel 22, and a plurality of softkeys 24 arranged in the configuration shown in FIG. 1. The loudspeaker 18, microphone 20, and softkeys 24 comprise components that are well known to one of ordinary skill in the art of wireless telephones. The front housing 12 houses transceiver circuitry that provides a wireless communication link with a base station, wireless local area network, a cellular system, and/or a cordless telephone.

The illustrated display panel 22 has a generally rectangular shape and has the same orientation as the front housing 12. In other words, the length (LD) and width (WD) extend parallel to the length (L) and width (W), respectively, of the communication device 10. Unlike typical wireless communication devices, the front housing 12 does not include a standard telephone keypad. Therefore, the display panel 22 can be made larger, compared to conventional wireless communication devices, without increasing footprint of the front housing 12. Referring to FIG. 1, the display panel 22 extends along at least 50% of the length of the front housing 12 so that extended alpha-numeric messages can be displayed on the display panel 22 in both landscape and portrait orientations.

The display panel 22 may comprise a conventional display, such as a liquid crystal display (LCD). The front housing, or one of the keypad housings, houses circuitry for receiving, processing and generating control signals for the display panel 22 such that text messages are automatically displayed. These messages, such as alpha-numeric characters 34, are displayed on the display panel 22 in the same orientation, either landscape or portrait, and in the same direction, as the graphic representations on the keys of the exposed keypad. For example, referring to FIG. 2, the characters 34 are displayed in a landscape orientation and in the same orientation as the keys on the keypad 17 exposed in this figure, whereas the characters are shown displayed in a portrait orientation and in the same orientation as the keypad 15 exposed in FIG. 3.

Each of the keypads 15, 17 is functionally connected to the display panel 22 on the front housing 12 and has a key configuration that is different than the other. The first, or telephone, keypad 15 has a standard telephone keypad configuration as seen in FIG. 3, and the second keypad 17 has a text entry keypad, illustrated as a Roman alphabet typewriter or computer keyboard (commonly referred to as "QWERTY") configuration as seen in FIG. 2. However, the first, but preferably the second, keypad 15, 17 may comprise any other known keypad configuration such as the game keypad configuration 115 provided in the alternative embodiment illustrated in FIG. 4. The second, or text keypad 17, can be any suitable text entry device optimized for entry of text in a desired language, such as Chinese, Japanese or Korean. By providing a single common display panel 22 functionally connected to each of the keypads 15, 17, the cost of the communication device 10 is reduced compared to a providing a respective display panel for each keypad 15, 17.

The front housing 12 and keypad housings 14, 16 telescopically slide transversely relative to one another in overlapping, parallel planes. In the nested configuration, each of the keypads 15, 17 is concealed underneath the front housing 12. Each of the keypads 15, 17 can be selectively exposed by sliding the front housing 12 in the lengthwise or widthwise direction to an extended position. Referring to FIG. 2, the second or middle keypad 17 is exposed by sliding the front housing 12 in the widthwise direction.

Referring to FIG. 3, the first or bottom keypad 15 is exposed by sliding the front housing 12 in the lengthwise direction. Because of the manner in which the front housing 12 and keypad housings 14, 16 are connected, lengthwise movement of the front housing 12 simultaneously drags or slides the second keypad housing 16 lengthwise to expose the first keypad 15. As described above, the display panel 22 automatically displays the characters on the display panel 22 in the same orientation and direction as the keys on the exposed keypad (15 or 17).

The first keypad 15 is exposed only when the front housing 12 moves from the nested configuration along a first path of travel, and the second keypad 17 is exposed only when the front housing 12 moves from the nested configuration along a second path of travel different than the first path of travel. The paths of travel are linear and transverse to one another. For example, only the middle, landscape-oriented keypad 17 is exposed when the front housing 12 slides from the nested configuration in the widthwise direction, while only the bottom, portrait-oriented keypad 15 is exposed when the front housing 12 slides from the nested configuration in the lengthwise direction. However, it should be appreciated by those skilled in the art that this configuration can be reversed without departing from the scope of the invention. In other words, the front housing 12 and keypad housings 14, 16 could be arranged so that the landscape-oriented keypad 17 is exposed when the front housing 12 slides in the lengthwise direction and the portrait-oriented keypad 15 is exposed when the front housing 12 slides in the widthwise direction.

In the embodiment illustrated in FIGS. 1–3, the softkeys 24 are functional when either keypad 15, 17 is exposed. Further, the softkeys 24 could be functionally connected to the display panel 22 to control different functions depending on whether the first 15 or second 17 keypad is exposed.

Referring to FIGS. 2–3, the front housing 12 and second keypad 17 are connected by opposed pairs of cooperating slides arranged on the widthwise-extending edges of the front housing 12 and second keypad housing 16. The slides limit movement of the front housing so that only one keypad can be exposed at a time. The widthwise edges of the front housing 12 and second keypad housing 16 have cooperating C-shaped guides 26, 28. In a similar manner, the first keypad housing 14 and second keypad housing 16 are connected by opposed pairs of cooperating slides arranged on the lengthwise-extending edges of the first 14 and second 16 keypad housings. The lengthwise edges of the first keypad housing 14 and second keypad housing 16 have cooperating C-shaped guides 30, 32. Other types of guide arrangements, such as tongue and groove arrangements, can be used.

The communication device 10 is portable, and such devices typically employ a battery (not shown). It is envisioned the battery will be advantageously located within the housing 14 of the lowest keypad 15, to facilitate access for changing the battery. Alternatively, the battery may be housed within the front housing 12 or the intermediate keypad housing 16.

Figure 4:
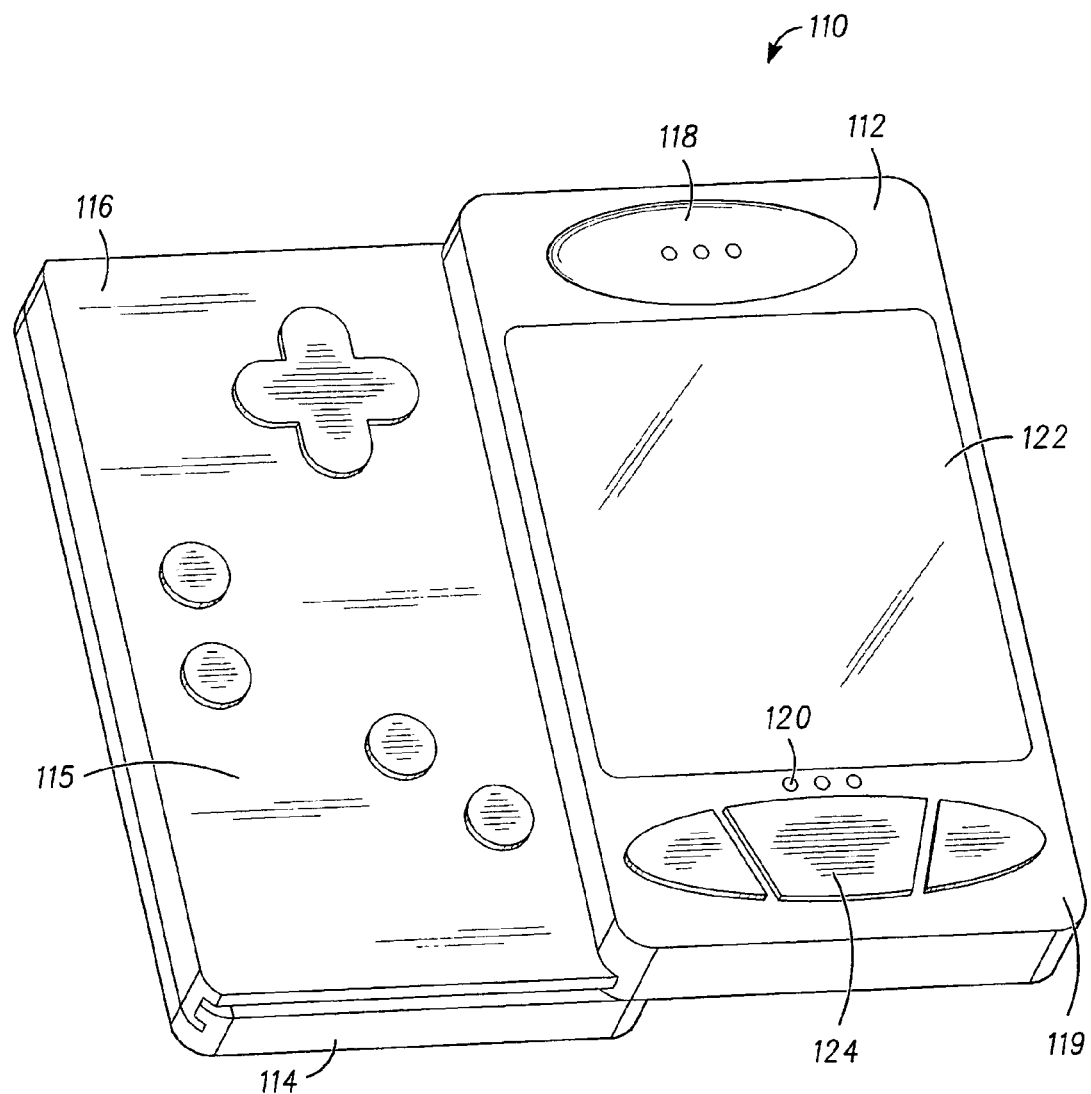
FIG. 4 is a perspective view of a wireless communication device in accordance with another embodiment of the invention wherein the front housing has been slid in the widthwise direction to expose a video game keypad.

A wireless communication device 110 in accordance with another embodiment of the invention is shown in FIG. 4. Similar to the previous embodiment, the wireless communication device generally comprises a front housing 112, first keypad housing 114 and second keypad housing 116. The front housing 112 includes a faceplate 119, an earpiece loudspeaker 118, a microphone 120, display panel 122, and a plurality of softkeys 124 arranged in the configuration shown in FIG. 4. The front housing 112 and keypad housings 114, 116 are similar in construction to the wireless communication device 10 described above except that the second keypad 117 has a game pad configuration instead of a QWERTY keypad. The game pad configuration is designed to be used to play games and includes a 4-way toggle switch or joystick.

While the principles of the invention have been described above in connection with illustrated embodiments, it is to be clearly understood that this description is made only by way of example and not as a limitation of the scope of the invention.

The invention claimed is:
1. A communication device, comprising:
a front housing having a display panel that displays characters in at least two orientations;
a first keypad housing including a first keypad being functionally connected to the front housing and having a plurality of keys arranged in a first configuration; and a second keypad housing including a second keypad being functionally connected to the front housing and having a plurality of keys arranged in a second configuration;

wherein the first configuration is different from the second configuration;

wherein the front housing, first keypad housing, and second keypad housing are adapted to overlap and stack in a nested configuration in which the first and second keypads are at least partially concealed by the front housing, and the front housing is movable relative to each of the first and second keypad housings from the nested configuration to an extended position in which at least one of the first and second keypads is exposed.

2. The communication device of claim 1, wherein the second keypad housing is movable relative to the first keypad housing from the nested configuration to an extended position.

3. The communication device of claim 2, wherein the second keypad is exposed by moving the front housing from the nested configuration to an extended position, and the first keypad is exposed by simultaneously moving the front housing and the second keypad housing to an extended position.

4. The communication device of claim 1, wherein the first keypad is exposed by moving the front housing from the nested configuration along a first path of travel, and the second keypad is exposed by moving the front housing from the nested configuration along a second path of travel, the second path of travel being different than the first path of travel.

5. The communication device of claim 4, wherein the first path of travel is transverse to the second path of travel.

6. The communication device of claim 5, wherein the first and second paths of travel are linear.

7. The communication device of claim 1, wherein the plurality of keys of the first keypad are arranged in a QWERTY configuration and the plurality of keys of the second keypad are arranged in a telephone keypad configuration.

8. The communication device of claim 1, wherein the plurality of keys of the first keypad are arranged in a game pad configuration and the plurality of keys of the second keypad are arranged in a telephone keypad configuration.

9. The communication device of claim 1, wherein the at least two orientations include a first orientation and a second orientation, the plurality of keys of the first keypad are arranged in a third orientation and the plurality of keys of the second keypad are arranged in a fourth orientation, wherein the first orientation is the same as the third orientation and the second orientation is the same as the fourth orientation.

10. The communication device of claim 1, including a plurality of softkeys on the front housing that are operational when either the first or second keypad is exposed.

11. The communication device of claim 1, wherein the front housing, the first and second keypad housings are telescopically connected to one another.

12. The communication device of claim 1, wherein the front housing further comprises a speaker and a microphone.

13. A communication device, comprising:
a front housing having a display panel that can display characters in a first and second orientations relative to the front housing;
a first keypad housing having a first keypad functionally connected to the front housing, the first keypad having keys having a third orientation and arranged in a first key configuration; and a second keypad housing having a second keypad functionally connected to the front housing, the second keypad being structurally arranged between the front housing and the first keypad housing, and telescopically connected to the front housing and the first keypad housing, the second keypad including keys having a fourth orientation and arranged in a second key configuration;

wherein the first key configuration is different from the second key configuration;

wherein the front housing, the first keypad housing and the second keypad housing are adapted to telescopically slide to overlap and stack in a nested configuration in which the first and second keypads are concealed underneath the front housing, and the front housing can telescopically slide relative to each of the first and second keypad housings from the nested configuration to an extended position to selectively expose one of the first and second keypads;

wherein the first and third orientations are the same and the second and fourth orientations are the same; and wherein the display panel displays characters in the first orientation when the first keypad housing is in the extended position and the display panel displays characters in the second orientation when the second keypad housing is in the extended position.

14. The communication device of claim 13, wherein the second keypad is exposed by sliding the front housing from the nested configuration to an extended position, and the first keypad is exposed by simultaneously sliding the front housing and the second keypad housing to an extended position.

15. The communication device of claim 13, wherein the first key configuration is a telephone key configuration and the second key configuration is a QWERTY key configuration or a game pad configuration.

16. The communication device of claim 15, wherein the communication device has a width (W) and a length (L) that is greater than the width, and the keys of the second keypad are oriented along the length of the device, and the keys of the first keypad are oriented along the width of the device.

17. The communication device of claim 13, wherein the second keypad is exposed when the front housing slides from the nested configuration along the width of the device, and the first keypad is exposed when the front housing slides from the nested configuration along the length of the device.

18. The communication device of claim 13, wherein the front housing, first keypad housing and second keypad housing each have a generally-rectangular shape and are all approximately equal in size.

19. The communication device of claim 13, wherein the front housing and second keypad housing are connected by opposed pairs of cooperating slides arranged on widthwise-extending edges of the front housing and second keypad housing, and the second keypad housing and first keypad housing are connected by opposed pairs of cooperating slides arranged on lengthwise-extending edges of the first and second keypad housings.

20. The communication device of claim 13, wherein the front housing further comprises a speaker and a microphone.

21. A communication device, comprising:
a front housing having a display panel that can display characters in a first and second orientations relative to the front housing;
a first keypad housing having a first keypad functionally connected to the front housing and having keys having a third orientation and arranged in a QWERTY key configuration or a game pad configuration; and a second keypad housing having second keypad functionally connected to the front housing, the second keypad housing being structurally arranged between the front housing and the first keypad housing, and telescopically connected to the front housing and the first keypad housing, the second keypad including keys having a fourth orientation and arranged in a telephone keypad configuration;

wherein the front housing, the first keypad housing and the second keypad housing are adapted to telescopically slide to overlap and stack in a nested configuration in which the first and second keypads are concealed underneath the front housing, and the front housing can telescopically slide relative to each of the first and second keypad housings from the nested configuration to an extended position to selectively expose one of the first and second keypads;

wherein the first and third orientations are the same and the second and fourth orientations are the same;

wherein the display panel displays characters in the first orientation when the first keypad is in the extended position and the display panel displays characters in the second orientation when the second keypad housing is in the extended position; and wherein the front housing and second keypad housing are connected by opposed pairs of cooperating slides arranged on the widthwise-extending edges of the front housing and second keypad housing, and the second keypad housing and first keypad housing are connected by opposed pairs of cooperating slides arranged on the lengthwise-extending edges of the first and second keypad housings.

22. The communication device of claim 21, wherein the front housing further comprises a speaker and a microphone.

23. A communication device, comprising:
a display panel that displays characters in a first orientation and a second orientation;
a first keypad functionally connected to the display panel and having a plurality of keys arranged in a first configuration, the first keypad being slidable from a nested position to an extended position along a first path of travel; and
a second keypad functionally connected to the display panel and having a plurality of keys arranged in a second configuration, the second keypad being slidable from a nested position to an extended position along a second path of travel;
wherein the first configuration is different from the second configuration and the first path of travel is transverse to the second path of travel.

24. The communication device of claim 23, wherein the first and second paths of travel are linear.

25. The communication device of claim 23, wherein the display, first keypad, and second keypad overlap and stack when the first and second keypads are both in a nested position.

* * * * *